United States Patent
Miyaoh

[19]

[11] Patent Number: 6,139,025
[45] Date of Patent: *Oct. 31, 2000

[54] METAL LAMINATE GASKET WITH WIDE AND NARROW FLANGE PORTIONS

[75] Inventor: Yoshio Miyaoh, Tokyo, Japan

[73] Assignee: Ishikawa Gasket Co., Ltd., Tokyo, Japan

[*] Notice: This patent is subject to a terminal disclaimer.

[21] Appl. No.: 09/149,170

[22] Filed: Sep. 8, 1998

Related U.S. Application Data

[63] Continuation-in-part of application No. 09/082,479, May 21, 1998, Pat. No. 6,019,376.

[30] Foreign Application Priority Data

Jul. 17, 1997 [JP] Japan ................................. 9-192183
Oct. 13, 1997 [JP] Japan ................................. 9-278521

[51] Int. Cl.[7] ........................... F16J 15/08; F02F 11/00
[52] U.S. Cl. ................................. 277/593; 277/595
[58] Field of Search .............................. 277/592, 593, 277/594, 595, 601

[56] References Cited

U.S. PATENT DOCUMENTS

| | | |
|---|---|---|
| 4,721,315 | 1/1988 | Ueta . |
| 4,898,396 | 2/1990 | Udagawa . |
| 4,915,398 | 4/1990 | Kitagawa ............................. 277/207 |
| 5,058,908 | 10/1991 | Udagawa ............................. 277/235 |
| 5,435,575 | 7/1995 | Udagawa ............................. 277/235 |
| 5,634,646 | 6/1997 | Miyaoh ............................. 277/235 |
| 5,957,463 | 9/1999 | Inamura ............................. 277/593 |

FOREIGN PATENT DOCUMENTS 0 574 166  12/1993  European Pat. Off. .
0 697 550   2/1996  European Pat. Off. .

*Primary Examiner*—Anthony Knight
*Assistant Examiner*—Vishal Patel
*Attorney, Agent, or Firm*—Kaensaka & Takeuchi

[57] ABSTRACT

A metal laminate gasket for an internal combustion engine is formed of first, second and third metal plates. The first metal plate includes a base portion, a curved portion extending from the base portion to define a hole for a cylinder bore, and a flange extending from the curved portion and disposed under the base portion. The flange has a plurality of wide flange portions and narrow flange portions alternately arranged to each other such that the wide flange portions are located near bolt holes arranged around the cylinder bore to support high tightening pressures applied thereto. The second plate is situated under the base portion, and has a first bead formed around the cylinder bore and disposed between the base portion and the flange. The third plate is situated between the base portion and the second metal plate, and is located outside the flange. The tightening pressures by bolts are supported by the wide and narrow flange portions to securely seal around the cylinder bore.

7 Claims, 1 Drawing Sheet

METAL LAMINATE GASKET WITH WIDE AND NARROW FLANGE PORTIONS

CROSS-REFERENCE TO RELATED APPLICATION

This is a continuation in part application of Ser. No. 09/082,479 filed on May 21, 1998U.S. Pat No. 6,019,376.

BACKGROUND OF THE INVENTION AND RELATED ART STATEMENT

The present invention relates to a metal laminate gasket with narrow and wide flange portions alternately arranged to each other to securely seal around a hole in an internal combustion engine.

A metal gasket or metal laminate gasket is installed between two engine parts to securely seal around sealing holes. In the engine, since high pressure and temperature are formed in or around the sealing holes, there have been proposed many sealing mechanisms.

In the engine, high temperature and pressure are generally formed in a cylinder bore. Therefore, in a cylinder head gasket, bolts for connecting a cylinder head and a cylinder block are arranged around the cylinder bore to secure seal around the cylinder bore.

In this case, if high tightening pressures are applied immediately outside the cylinder bore, the cylinder bore may deform due to the high tightening pressures applied from the bolts. Therefore, in the engine, the high tightening pressures should not be simply applied around the cylinder bore.

In one type of the convention gaskets, the gasket is formed of two or three plates, such as U.S. Pat. No. 4,898,396 and No. 5,213,345. A first metal plate is turned around a hole or cylinder bore to be sealed to form a flange disposed above a base portion of the first metal plate, and a second metal plate is located on the base portion. The second metal plate may be situated between the flange and the base portion, or may not overlap the flange. A bead or sealing device is formed on one of the first and second plates to surround the cylinder bore.

In this gasket, when the gasket is tightened with high tightening pressures by bolts, portions on the flange near the bolts receive high tightening pressures from the bolts. Namely, high tightening pressures are applied at the portions near the bolt holes around the cylinder bore, while the low tightening pressures are formed in other portions around the cylinder bore. Thus, when the tightening pressures around the sealing hole or cylinder bore are considered as a whole, the high and low tightening pressures are formed around the cylinder bore. Namely, the tightening pressures are not properly distributed around the cylinder bore to possibly cause leakage from the cylinder bore or deformation of the cylinder bore.

In order to securely seal around the hole, parts of the bead away from the bolt holes may be arranged to provide high surface pressure, such as disclosed in U.S. Pat. No. 4,759, 556. On the other hand, a spring constant of one bead may be partly changed to securely seal around a hole, such as disclosed in U.S. Pat. No. 5,269,541.

The conventional gaskets operate properly, as intended. However, it is still required to improve a sealing quality and prevent deformation of the cylinder bore.

The present invention has been made in view of the conventional gaskets, and an object of the invention is to provide a metal laminate gasket which can securely seal around a hole to be sealed.

Another object of the invention is to provide a metal laminate gasket as stated above, wherein influences by local tightening pressures by bolts are minimized.

A further object of the invention is to provide a metal laminate gasket as stated above, wherein an area around the hole to be sealed can receive an equal tightening pressure.

Further objects and advantages of the invention will be apparent from the following description of the invention.

SUMMARY OF THE INVENTION

A metal laminate gasket of the invention is used for an internal combustion engine having a sealing hole to be sealed and a plurality of bolt holes situated around the sealing hole. The gasket is basically formed of first, second and third metal plates laminated together.

The first metal plate includes a base portion extending throughout an entire area of the gasket, first and second holes formed in the base portion and communicating with the sealing hole and bolt holes of the engine, respectively, a curved portion extending from the base portion to define the first hole, and a flange extending from the curved portion and disposed under the base portion. The flange is provided with a plurality of wide flange portions and narrow flange portions alternately arranged to each other. The wide flange portions are located near the second holes communicating with the bolt holes to support high tightening pressures applied thereto, and the narrow flange portions are located away from the second holes, i.e. between the second holes.

The second metal plate is situated under the base portion of the first plate, and includes third and fourth holes communicating with the sealing hole and the bolt holes of the engine, respectively. A first bead is formed in the second metal plate around the third hole communicating with the sealing hole and is disposed between the base portion and the flange. On the other hand, the third metal plate is situated between the base portion and the second metal plate, and located outside the flange.

When the gasket is situated between a cylinder head and a cylinder block and is tightened, the portions of the gasket close to the bolt holes receive high tightening pressures. Therefore, the wide flange portions are formed close to the bolt holes. As a result, the tightening pressures are widely supported by the wide flange portions. As a whole, there are obtained substantially equal tightening pressures around the hole to be sealed.

It is preferable that the narrow flange portions have constant widths, and the wide flange portions have curved edges extending from the narrow flange portions toward the respective second holes located close to the respective wide flange portions.

The third metal plate includes a fifth hole greater than an outer diameter of the flange, and sixth holes communicating with the bolt holes. A second bead is formed in the third metal plate to surround the fifth hole.

In the invention, at least one of the first and second beads includes a plurality of wide bead portions and narrow bead portions alternately arranged to each other. In this case, the wide bead portions are located close to the second holes, i.e. bolt holes, and the narrow bead portions are located away from the second holes to provide high surface pressures thereat. Preferably, the first and second beads include the wide bead portions and narrow bead portions alternately arranged to each other, respectively.

Further, the wide bead portions in each of the first and second beads may be located closer to the first hole than the narrow bead portions thereof. Namely, the distance from the top center of the wide bead portion to the nearest sealing hole is less than the distance from the top center of the narrow bead portion to the nearest sealing hole, to thereby provide the surface pressure around the hole as equal as possible.

In the invention, coating layers may be provided on both sides of the third metal plate to seal between the plates.

DETAILED DESCRIPTION OF PREFERRED EMBODIMENTS

Figure 1:
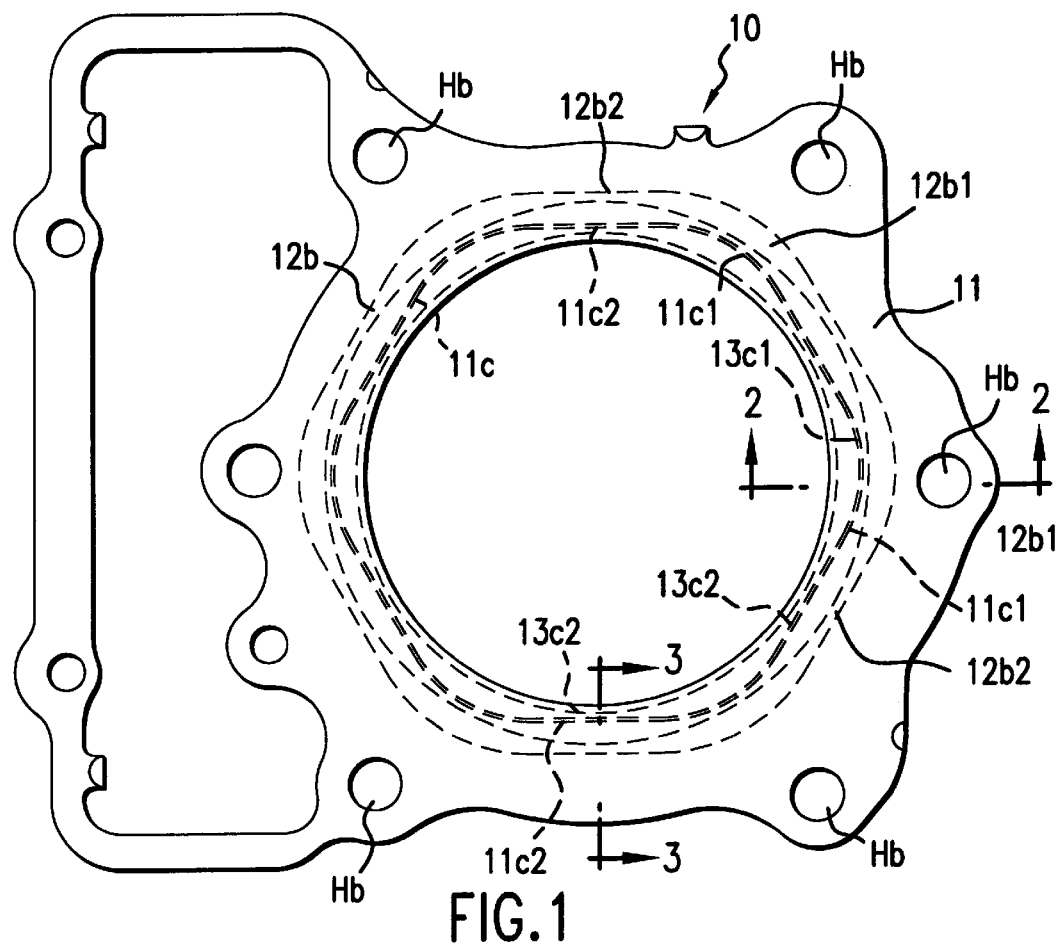
FIG. 1 is a plan view of a cylinder head gasket of the invention.
Figure 2:
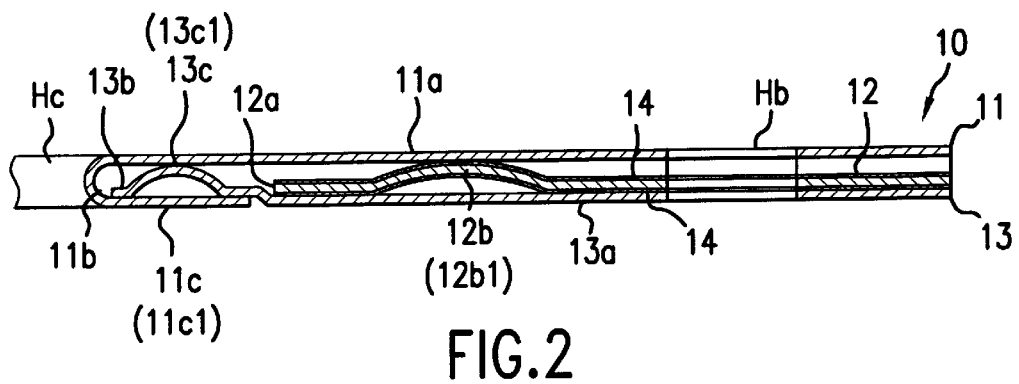
FIG. 2 is an enlarged cross sectional view taken along line 2—2 in FIG. 1.
Figure 3:
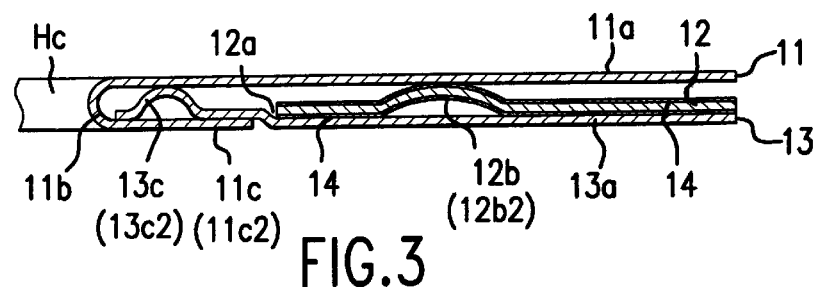
FIG. 3 is an enlarged cross sectional view taken along line 3—3 in FIG. 1.

With reference to FIGS. 1–3, a gasket 10 of the invention applied to a cylinder head gasket will be explained.

An engine (not shown) to which the gasket is applied is a type such that a cylinder block is provided with a plurality of cylinder bores, to which a plurality of cylinder heads, each having one cylinder bore, is attached. However, the gasket of the invention may be applied to a regular engine formed of one cylinder block and one cylinder head and having a plurality of cylinder bores therein.

The gasket 10 has one cylinder bore Hc, and a plurality of bolt holes Hb situated around the cylinder bore Hc. When the gasket 10 is installed between the cylinder block and the cylinder head (both not shown), the cylinder bore Hc and the bolt holes Hb of the gasket 10 communicate with the cylinder bore and bolt holes of the engine, i.e. cylinder head and cylinder block, respectively.

The gasket 10 is formed of an upper metal plate 11, a middle metal plate 12 situated under the upper metal plate 11, and a lower metal plate 13 situated under the middle plate 12. The upper, middle and lower plates 11, 12, 13 include holes for constituting the cylinder bore Hc and bolt holes Hb.

The upper plate 11 includes a base portion 11a, a curved portion 11b extending from the base portion 11a to define the cylinder bore Hc, and a flange 11c extending from the curved portion 11b and disposed under the base portion 11a. The flange 11c includes wide portions 11c1, and narrow portions 11c2 arranged alternately. The wide portions 11c1 are located close to the bolt holes Hb, while the narrow portions 11c2 are located away from the bolt holes Hb, i.e. between the bolt holes Hb. The outer edges of the narrow portions 11c2 are curved concentrically with respect to the cylinder bore Hc, and the outer edges of the wide portions 11c1 project or curve outwardly toward the respective bolt holes Hb to form wide areas.

The middle plate 12 is located under the base portion 11a of the upper plate 11, and includes an opening 12a greater than the outer periphery of the flange 11c. Thus, the middle plate 12 does not overlap the flange 11c. The middle plate 12 also includes a bead 12b to surround the opening 12a, which includes wide portions 12b1, and narrow portions 12b2 arranged alternately. The wide portions 12b1 are located close to the bolt holes Hb, while the narrow portions 12b2 are located away from the bolt holes Hb, i.e. between the bolt holes Hb. The top points or centers of the beads 12b at the wide portions 12b1 are located slightly closer to the edge of the cylinder bore Hc than those of the beads 12b at the narrow portions 12b2.

Coating layers 14 are formed on the entire upper and lower surfaces of the middle plate 12 to prevent fluid from flowing between the plates. Since the coating layers 14 are not located near the cylinder bore Hc, the coating layers 14 may contain a material not strong against high temperature and pressure but suitable to seal fluid. The coating layers 14 may be made of a resin or rubber, such as fluorine resin or rubber, NBR and so on.

The lower plate 13 includes a base portion 13a located under the middle plate 12, and an edge portion 13b situated inside the base portion 13a and located between the base portion 11a and the flange 11c. The lower plate 13 also includes a bead 13c in the edge portion 13b, which includes wide portions 13c1, and narrow portions 13c2 arranged alternately. The wide portions 13c1 are located close to the bolt holes Hb, while the narrow portions 13c2 are located away from the bolt holes Hb, i.e. between the bolt holes Hb. The top points or centers of the bead 13c at the wide portions 13c1 are located slightly closer to the edge of the cylinder bore Hc than those at the narrow portions 13c2.

In the gasket 10, since the wide portions 11c1 of the flange 11c project toward the bolt holes Hb, when the gasket is situated between the cylinder head and cylinder block, and is tightened by bolts passing through the bolt holes Hb, high tightening pressures caused by the bolts are supported widely by the wide portions 11c1 close to the bolt holes Hb. Thus, as a whole, substantially equal tightening pressures are applied around the cylinder bore Hc.

In the gasket 10 of the invention, the bead 12b is formed in the middle plate 12 outside the flange 11c, which has wide portions 12b1 and narrow portions 12b2 arranged alternately. The wide portions 12b1 are located close to the bolt holes Hb, while the narrow portions 12b2 are located away from the bolt holes Hb, i.e. between the bolt holes. Similarly, the bead 13c formed in the lower plate 13 has the wide portions 13c1 and narrow portions 13c2 arranged alternately. The wide portions 13c1 are located close to the bolt holes Hb, and the narrow portions 13c2 are located away from the bolt holes Hb.

When the gasket 10 is tightened, the wide portions 12b1, 13c1 are relatively easily compressed as compared to the narrow portions 12b2, 13c2, and the narrow portions 12b2, 13c2 provide surface pressures greater than those of the wide portions 12b1, 13c1. Since the narrow portions 12b2, 13c2 are located away from the bolt holes Hb, when the gasket is tightened, the narrow portions 12b2, 13c2 are compressed less than that of the wide portions 12b1, 13c1. In considering the locations and compression degrees of the wide and narrow portions of the beads 12b, 13c, since the narrow portions 12b2, 13c2 are located away from the bolt holes Hb, when the gasket is tightened, as a whole, the beads 12b, 13c provide substantially equal surface pressures thereat.

Also, in the gasket of the invention, the top points or centers of the wide portions 12b1, 13c1 of the beads 12b, 13c are located slightly closer to the edge of the cylinder bore Hc than the top points or centers of the narrow portions 12b2, 13c2. Accordingly, a relatively strong surface pressures are formed on the narrow portions 12b2, 13c2 where relatively weak surface pressures are formed. When the gasket is compressed, as a whole, substantially equal surface pressures are formed on the beads 12b, 13c to thereby securely seal around the cylinder bore Hc.

In the invention, the flange 11c has the wide and narrow portions 11c1, 11c2, wherein the high tightening pressures applied from the bolts are supported by the wide portions 11c1, and the tightening pressures less than the high tightening pressures are supported by the narrow portions 11c2. This structure can help preventing deformation of the cylinder bore due to the unbalanced tightening pressures applied by the bolts. Also, the cylinder bore Hc can be securely sealed.

In the invention, the wide and narrow portions 13c1, 13c2 of the bead 13c provide appropriate surface pressures on the wide and narrow portions 11c1, 11c2 of the flange 11c. Also, the wide and narrow portions 12b1, 12b2 of the bead 12b are formed outside the flange 11c. Thus, the beads can provide surface pressures substantially equally throughout the entire areas of the beads with reference to the tightening pressures applied from the bolts. In case the positions of the beads relative to the edge of the cylinder bore Hc are slightly changed according to the wide and narrow portions of the beads, the sealing ability of the beads are improved. As a whole, the cylinder bore Hc can be securely sealed in the invention.

In the above embodiment, both beads 12b, 13c have the wide and narrow portions. However, one of the beads 12b, 13c may have the wide and narrow portions, and the other of the beads 12b, 13c may have the constant width. In this structure, the gasket can operate properly.

Also, in the above embodiment, both wide portions 12b, 13c1 of the beads 12b, 13c are located closer to the cylinder bore Hc than the narrow portions 12b2, 13c2, respectively. However, one of the wide portions 12b1, 13c1 may be located closer to the cylinder bore Hc than the narrow portions thereof, and the other of the wide portions 12b1, 13c1 may be located concentrically with the narrow portions thereof, i.e. the distances from the top points or centers of the wide and narrow portions in one bead to the nearest edges of the cylinder bore are constant. In this structure, the gasket can operate properly.

While the invention has been explained with reference to the specific embodiment of the invention, the explanation is illustrative and the invention is limited only by the appended claims.

What is claimed is:

1. A metal laminate gasket for an internal combustion engine, said engine having a sealing hole to be sealed and a plurality of bolt holes situated around the sealing hole, comprising:

a first metal plate including a base portion extending throughout an entire area of the gasket, first and second holes formed in the base portion and communicating with the sealing hole and bolt holes of the engine, respectively, a curved portion extending from the base portion to define the first hole, and a flange extending from the curved portion and disposed under the base portion, said flange having a plurality of wide flange portions and narrow flange portions alternately arranged to each other such that the wide flange portions are located near the second holes to support high tightening pressures applied thereto;

a second metal plate situated under the base portion, said second metal plate having third and fourth holes communicating with the sealing hole and the bolt holes of the engine, respectively, and a first bead formed around the third hole and disposed between the base portion and the flange; and a third metal plate situated between the base portion of the first metal plate and the second metal plate and located laterally outside the flange.

2. A metal laminate gasket according to claim 1, wherein said third metal plate includes a fifth hole greater than an outer diameter of the flange, a sixth hole communicating with the bolt holes, and a second bead surrounding the fifth hole.

3. A metal laminate gasket according to claim 2, wherein at least one of the first and second beads includes a plurality of wide bead portions and narrow bead portions alternately arranged to each other, said narrow bead portions being located away from the second holes to provide high surface pressures thereat.

4. A metal laminate gasket according to claim 3, wherein a distance from a top point of each of the wide bead portions to a nearest edge of the first hole is less than a distance from a top point of each of the narrow bead portions to a nearest edge of the first hole.

5. A metal laminate gasket according to claim 3, wherein said first and second beads include the wide bead portions and narrow bead portions alternately arranged to each other, respectively, said respective narrow bead portions being located at portions away from the second holes.

6. A metal laminate gasket according to claim 1, wherein said narrow flange portions have constant widths, said wide flange portions having curved edges extending from the narrow flange portions toward the respective second holes located close to the respective wide flange portions.

7. A metal laminate gasket according to claim 6, further comprising coating layers coated on both sides of the third metal plate.

* * * * *

UNITED STATES PATENT AND TRADEMARK OFFICE
CERTIFICATE OF CORRECTION

PATENT NO : 6,139,025
DATED : October 31, 2000
INVENTOR(S) : Yoshio Miyaoh

It is certified that error appears in the above-identified patent and that said Letters Patent are hereby corrected as shown below:

ON THE COVER PAGE
Item [56], Attorney, Agent, or Firm's section,
   change "Kaensaka" to --Kanesaka--; and In COLUMN 6, LINE 21,
   change "a sixth hole" to --sixth holes--.

Signed and Sealed this

Eighth Day of May, 2001

*Attest:*

NICHOLAS P. GODICI

*Attesting Officer*     *Acting Director of the United States Patent and Trademark Office*